UNITED STATES PATENT OFFICE.

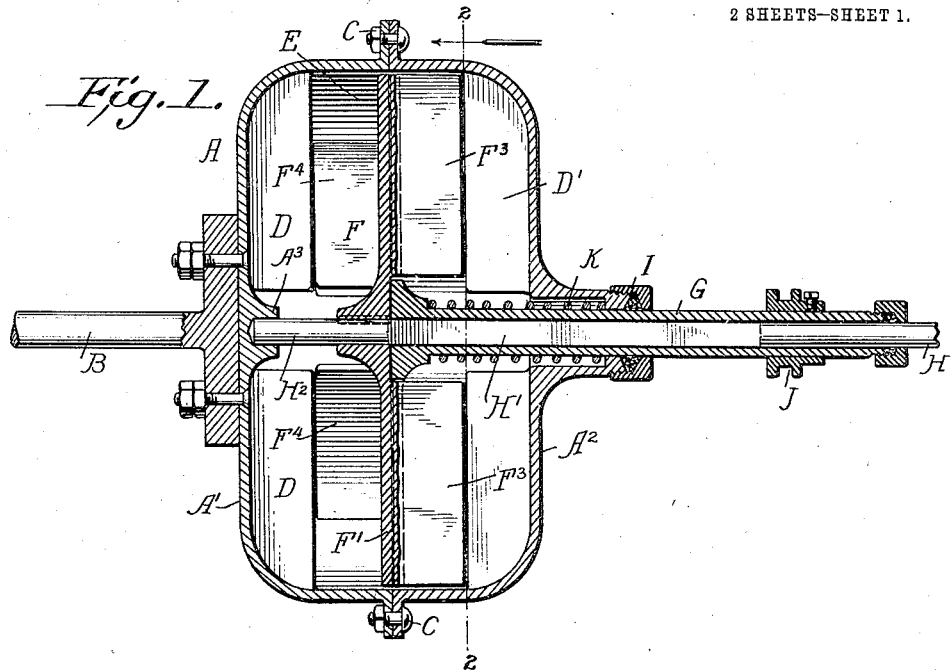

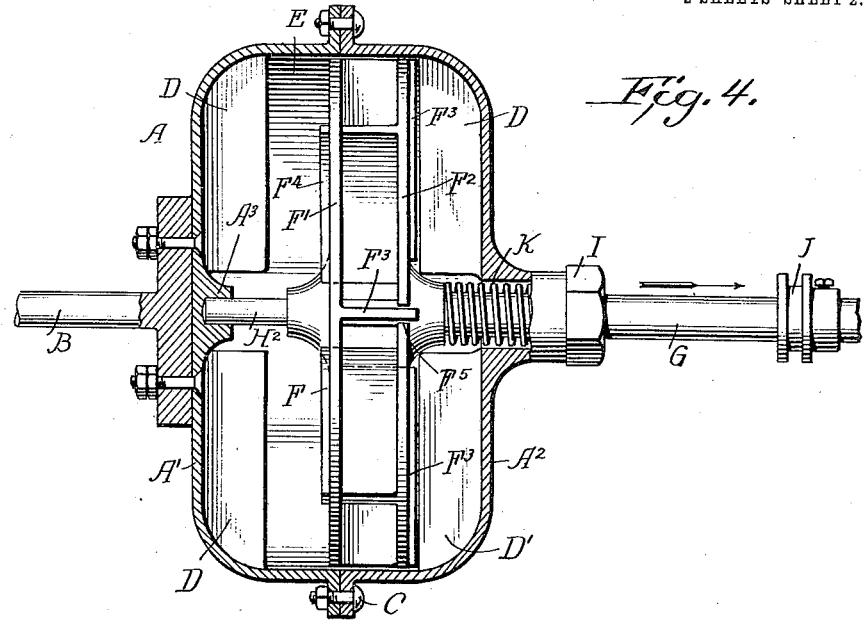
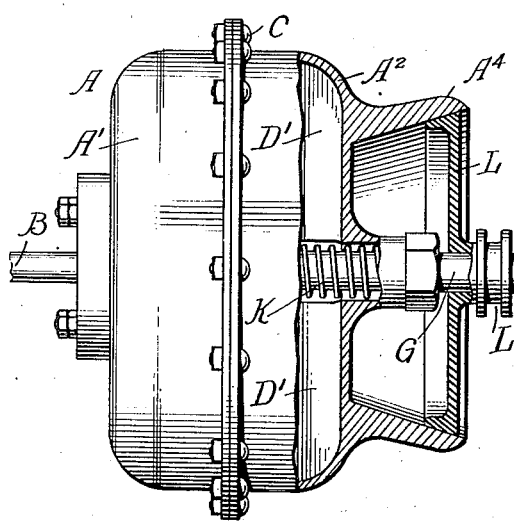
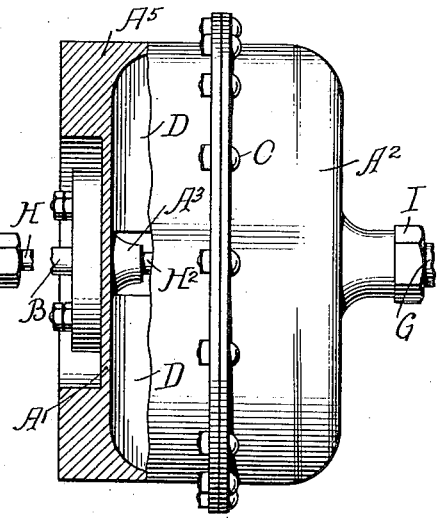

THOMAS D. W. PINCKNEY, OF NEW YORK, N. Y.

FLUID POWER-TRANSMITTER.

1,125,593.         Specification of Letters Patent.    Patented Jan. 19, 1915.

Application filed March 10, 1913. Serial No. 753,249.

*To all whom it may concern:*

Be it known that I, THOMAS D. W. PINCKNEY, a citizen of the United States, and a resident of the city of New York, borough of the Bronx, in the county and State of New York, have invented a new and Improved Fluid Power-Transmitter, of which the following is a full, clear, and exact description.

The invention relates to couplings or clutches, using a liquid for effecting the coupling between a driving and a driven member.

The object of the invention is to provide a new and improved fluid power transmitter or clutch designed for use on automobiles and other power-driven vehicles and machines and arranged to insure the proper transmission of power from one member to the other.

In order to accomplish the desired result use is made of a revoluble casing and a paddle wheel therein, the casing being the driving member and the paddle wheel being the member to be driven, the casing being filled with a liquid and being provided with inwardly-dished ends and radial vanes on the said ends to impart motion to the liquid in an outward direction, toward the middle of the casing, and against the vanes of the said paddle wheel, the latter being intermediate the said casing vanes.

A practical embodiment of the invention is represented in the accompanying drawings forming a part of this specification, in which similar characters of reference indicate corresponding parts in all the views.

Figure 1 is a longitudinal central section of the fluid power transmitter; Fig. 2 is a transverse section of the same on the line 2—2 of Fig. 1; Fig. 3 is a perspective view of one of the paddle wheel sections; Fig. 4 is a side elevation of the power transmitter with the casing shown in section and the paddle wheel in practically dormant position; Fig. 5 is a side elevation partly in section of a modified form of the transmitter; and Fig. 6 is a similar view of another modified form of the fluid power transmitter.

The closed casing A is secured to the driving shaft B connected with a motor, and the casing is preferably made in two parts A', A² fastened together by bolts C or other suitable means. The ends of the casing sections A' and A² are curved inwardly toward each other at their outer ends, as plainly indicated in Fig. 1, and on the said ends of the casing sections are arranged radially-disposed vanes D and D' having their inner edges spaced apart so as to provide a central space E within the casing A and in which central space is arranged a paddle wheel F. The paddle wheel F is preferably made in two sections having webs F', F² provided at their opposite faces with radially-disposed vanes F³, F⁴, of which the vanes F³ extend through radial slots F⁵ in the web F² while the vanes F⁴ extend through radial slots F⁶ in the web F'. When the webs F' and F² are in close proximity to each other, as indicated in Fig. 1, then the outer edges of the vanes F³, F⁴ are close to the inner edges of the vanes D and D', as plainly indicated in Fig. 1, that is, the vanes are in position for receiving the full impact of the liquid with which the casing A is filled. When the web F² is moved outward away from the web F' (see Fig. 4) then the vanes F³, F⁴ are moved more or less out of action according to the distance the webs are moved apart. Thus when the web F² is moved into outer extreme position the outer edges of the vanes F³, F⁴ do not project beyond the outer faces of the webs F², F' and consequently the paddle wheel is held dormant within the casing A, that is, the liquid contained in the casing does not transmit power to the paddle wheel.

The web F² is mounted or formed on a hollow shaft G while the web F' is connected with or otherwise fastened on a shaft H extending through the hollow shaft G. The shaft H is provided with a polygonal portion H' fitting a correspondingly-shaped bore in the hollow shaft G so that the shafts G and H rotate in unison but the shaft G is free to slide on the shaft portion H' of the shaft H. The shaft G extends through a suitable stuffing box I held on the casing section A², and on the outer end of the shaft G is secured a shifting collar J engaged by a shifting lever (not shown) under the control of the operator for shifting the shaft G so as to move the web F² toward or from the web F' for the purpose previously mentioned. A spring K is coiled on the inner portion of the shaft G and rests with one end on the stuffing box I and abuts with the other end against the web F² so as to normally press the web F² toward the web F'. The outer end of the shaft H is connected with the machinery to be driven and the inner end H² of the said shaft is journaled in a bearing A³ forming part of the section A' of the casing A.

The operation is as follows: When it is desired to transmit power from the shaft B to the shaft H, the operator moves the shifting collar J outward to draw the webs F', F² apart so that their vanes F³, F⁴ are practically in dormant position. The radial motion given to the shaft B causes a rotation of the casing A so that the liquid therein is carried around by the vanes D and D' and is thrown outward by centrifugal force and by the curved ends the liquid is thrown into the space E containing the paddle wheel F, but as the vanes of the paddle wheel F do not project the paddle wheel remains dormant. The operator now gradually shifts the collar J inward so that the web F² moves toward the web F' to project the vanes F³, F⁴ beyond the outer faces of the webs F² and F', and when this takes place the liquid in motion comes in contact with the projecting ends of the vanes thus rotating the paddle wheel in the same direction in which the casing A is revolved. The radial motion given to the paddle wheel F is transmitted by the shaft H to the machinery to be driven. By gradually moving the web F² toward the web F' more vane surface is presented to the liquid so that the transmission of power from the shaft B to the shaft H becomes gradually more powerful. When the web F² touches the web F' the vanes F³, F⁴ are projected to their fullest extent so that the vanes receive the maximum force of the rotating liquid.

It will be noticed that by the arrangement described the motor connected with the shaft B can be rotated with unvarying speed while that of the driven machinery may vary in its speed according to its varying load, and consequently all shock and jar is prevented and the motor can run its full efficiency.

When the power transmitter is used in automobiles and similar power-driven vehicles it is not necessary to change from a high to a low gear or vice versa as it is only necessary to shift the web F² toward or from the web F' for a more or less powerful transmission of the power from the shaft B to the shaft H.

In the modified form shown in Fig. 5, the casing section A² is provided on its outer face with a conical clutch member A⁴ adapted to be engaged by a correspondingly shaped clutch member L mounted to slide on the shaft G and provided with a shifting collar L' engaged by a shifting lever (not shown) under the control of the operator for shifting the clutch member L in or out of frictional contact with the casing clutch member A⁴, otherwise the construction is the same as above described in reference to Figs. 1 and 4, and further description is not deemed necessary.

In the modified form shown in Fig. 6 the outer portion A⁵ of the casing section is fashioned to provide a fly wheel for the casing A to insure steady running of the casing.

Although the casing A is described as the driving member and the paddle wheel as the driven member it is evident that the paddle wheel may be the driving member and the casing the driven member.

Having thus described my invention, I claim as new and desire to secure by Letters Patent:

1. A fluid power transmitter, comprising a casing with an inwardly-dished end provided with vanes and adapted to contain fluid, means for rotating said casing, and means in said casing adapted to be driven by the fluid in motion and connected with the machinery to be driven.

2. A fluid power transmitter, comprising a casing with opposite inwardly-dished ends provided with vanes and adapted to contain fluid, means for rotating said casing, and means in the middle part of said casing adapted to be driven by the fluid moved by said vanes and connected with the machinery to be driven.

3. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends to impart motion to the liquid in an outward direction and to the middle of the casing and against the vanes of the said paddle wheel, the paddle wheel being intermediate the casing vanes.

4. A fluid power transmitter, comprising a revoluble casing and a paddle wheel therein, the casing being the driving member and the paddle wheel being the member to be driven, the casing being filled with a liquid and being provided with inwardly dished ends and radial vanes on the said ends, the inner edges of the said casing vanes being spaced apart to provide a central space in the casing for the said paddle wheel, the latter having radial vanes receiving the impact of the fluid forced outward and into the said central space and against the said paddle wheel vanes to rotate the paddle wheel.

5. A fluid power transmitter, comprising a revoluble casing and a paddle wheel therein, the casing being the driving member and the paddle wheel being the member to be driven, the casing being filled with a liquid and being provided with inwardly dished ends and radial vanes on the said ends, the inner edges of the said casing vanes being spaced apart to form a central space in the casing for the said paddle wheel, the latter being made in sections each having a web provided with radial slots and radial vanes on the outer face, the webs of the sections being arranged face to face, and the vanes of one web extending through the slots of the other web.

6. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends, the inner edges of the said casing vanes being spaced apart to form a central space in the casing for the said paddle wheel, the latter being made in two sections each having a web provided with radial slots and radial vanes on the outer face, the webs of the sections being arranged face to face and the vanes of one web extending through the slots of the other web, and manually-controlled means for shifting one section relatively to the other.

7. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends, the inner edges of the said casing vanes being spaced apart to form a central space in the casing for the said paddle wheel, the latter being made in sections each having a web provided with radial slots and radial vanes on the outer face, the webs of the sections being arranged face to face, and the vanes of one web extending through the slots of the other web, manually-controlled means for shifting one section relatively to the other, and a spring pressing one of the said sections toward the other.

8. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends, the inner edges of the said casing vanes being spaced apart to form a central space in the casing for the said paddle wheel, the latter being made in sections each having a web provided with radial slots and radial vanes on the outer face, the webs of the sections being arranged face to face and the vanes of one web extending through the slots of the other web, one of the webs having a hollow shaft extending through one end of the casing to the outside thereof and the other web having a shaft extending through the said hollow shaft and rotating with the latter.

9. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends, the inner edges of the said casing vanes being spaced apart to form a central space in the casing for the said paddle wheel, the latter being made in sections each having a web provided with radial slots and radial vanes on the outer face, the webs of the sections being arranged face to face, and the vanes of one web extending through the slots of the other web, one of the webs having a hollow shaft extending through one end of the casing to the outside thereof and the other web having a shaft extending through the said hollow shaft and rotating with the latter, and shifting means for shifting the said hollow shaft on the other shaft to move the webs nearer together or farther apart.

10. A fluid power transmitter, comprising a revoluble casing and a paddle wheel therein, the casing being the driving member and the paddle wheel being the member to be driven, the casing being filled with a liquid and being provided with inwardly-dished ends and radial vanes on the said ends, the inner edges of the said casing vanes being spaced apart to form a central space in the casing for the said paddle wheel, the latter being made in sections each having a web provided with radial slots and radial vanes on the outer face, the webs of the sections being arranged face to face and the vanes of one web extending through the slots of the other web, one of the webs having a hollow shaft extending through one end of the casing to the outside thereof and the other web having a shaft extending through the said hollow shaft and rotating with the latter, and its end having a bearing in the said casing.

11. A fluid power transmitter, comprising a casing provided at its opposite ends with interior vanes, means for rotating said casing, a wheel in the middle of said casing having vanes adapted to project oppositely into proximity to said vanes on the casing, and means extending from said wheel outside the casing to transmit the rotation thereof.

12. In a fluid power transmitter, the combination with a casing having inwardly dished ends and provided with vanes, the said casing being adapted to contain fluid, of a wheel in the said casing comprising sections which can be shifted to expose vanes on said sections or to withdraw said vanes from the action of the fluid, and means extending from said wheel outside the casing to transmit the motion thereof.

13. In a fluid power transmitter, the combination with a casing adapted to contain fluid and having interior vanes at its ends, of a wheel arranged in said casing between the end vanes and comprising sections each provided with vanes, the sections being adjustable with respect to each other to expose vanes on said sections more or less to the action of the fluid, and means extending from said wheel outside the casing to transmit the motion thereof.

14. In a fluid power transmitter the combination with a casing adapted to contain fluid and having interior vanes, of a wheel comprising sections each having vanes interlocking with the other section, the sections being adjustable with respect to each other to vary the action of the fluid upon said wheel, and means extending from said wheel outside the casing to transmit the motion thereof.

15. In a fluid power transmitter, the combination with a casing adapted to contain fluid and having interior vanes, of a wheel comprising sections each having a web and vanes thereon adapted to project through the web of the other section, means for moving said webs toward and away from each other, and means for transmitting the motion of said wheel outside the casing.

16. In a fluid power transmitter, the combination with a casing adapted to contain fluid and having interior vanes, of a wheel comprising sections one of which is slotted and the other of which has vanes adapted to project through the slots, means for moving said sections toward and away from each other, and means for transmitting the motion of said wheel outside the casing.

17. In a fluid power transmitter, the combination with a casing adapted to contain fluid and having interior vanes, of a wheel comprising sections each having a web with radial vanes and radial slots between said vanes, the vanes of one section entering the slots of the other section, means for moving said sections toward and away from each other, and means for transmitting the motion of said wheel outside the casing.

18. A fluid power transmitter, comprising a casing provided at its ends with interior vanes and adapted to contain a liquid, and a paddle wheel in said casing, one of said members being the driving member for imparting motion to the liquid and the other the member to be driven by the liquid in motion, the said paddle wheel being formed in two sections each consisting of a web formed with slots and provided with vanes, the vanes of one web being adapted to extend through the slots of the other web, and means for shifting one section of the paddle wheel relatively to the other to cause the vanes to project more or less beyond the outer faces of the webs.

19. A fluid power transmitter, comprising a casing, and a paddle wheel therein, one of said members being the driving member and the other the member to be driven, the casing containing a liquid and provided internally at its ends with vanes, the inner edges of the said vanes being spaced apart to provide a central space in the casing for the said paddle wheel, the paddle wheel being made in sections each having a web provided with slots and vanes, the vanes of one web extending through the slots of the other web, means for shifting one section of the paddle wheel relatively to the other, and means for rotating the driving member to impart motion to the liquid to actuate the driven member, the latter member being connected with the machinery to be driven.

20. A fluid power transmitter, comprising a casing provided at its ends with interior vanes and adapted to contain a fluid, and a wheel arranged in the middle portion of said casing between the said end vanes, one of said members being the driving member, and the other the member to be driven by the fluid in motion, the said wheel being formed in two sections each provided with vanes, one of said sections being adjustable relative to the other section to expose the vanes on said sections more or less to the action of the fluid, and means for rotating the driving member to impart motion to the fluid to actuate the driven member.

In testimony whereof I have signed my name to this specification in the presence of two subscribing witnesses.

THOMAS D. W. PINCKNEY.

Witnesses:
  THEO. G. HOSTER,
  PHILIP D. ROLLHAUS.